United States Patent [19]

Fouilloy

[11] 4,397,429
[45] Aug. 9, 1983

[54] DEVICE FOR DETECTING A HOT POINT IN A SCENE BY MEANS OF INFRARED RADIATION AND MISSILE GUIDANCE SYSTEM EQUIPPED WITH SUCH A DEVICE

[75] Inventor: Jean-Pierre Fouilloy, Velizy, France

[73] Assignee: U.S. Philips Corporation, New York, N.Y.

[21] Appl. No.: 220,594

[22] Filed: Dec. 29, 1980

[30] Foreign Application Priority Data

Sep. 12, 1979 [FR] France .................. 79 22794

[51] Int. Cl.³ .................................................. F41G 7/30
[52] U.S. Cl. .................................................. 244/3.11
[58] Field of Search ............... 244/3.11, 3.12, 3.13, 244/3.14, 3.16

[56] References Cited

U.S. PATENT DOCUMENTS

| 3,934,137 | 1/1976 | Loy ........................ 250/236 |
| 3,974,383 | 8/1976 | Chapman .................. 244/3.11 |
| 4,030,686 | 6/1977 | Buchman ................... 244/3.13 |
| 4,038,547 | 7/1977 | Hoesterey ................. 244/3.11 |
| 4,202,515 | 5/1980 | Maxwell, Jr. ............. 244/3.11 |

FOREIGN PATENT DOCUMENTS 2533270  2/1977  Fed. Rep. of Germany .

Primary Examiner—Charles T. Jordan
Attorney, Agent, or Firm—Marc D. Schechter

[57] ABSTRACT

A scanning infrared beam is split into two subbeams. The first and second subbeams contain radiation of wavelengths situated in a first and second subband of the infrared wavelength band of the beam. For each subbeam there is provided a separate radiation-sensitive detector. The output signals of the detectors are applied to a subtractor circuit, whose output signal indicates the presence of a hot point.

8 Claims, 5 Drawing Figures

DEVICE FOR DETECTING A HOT POINT IN A SCENE BY MEANS OF INFRARED RADIATION AND MISSILE GUIDANCE SYSTEM EQUIPPED WITH SUCH A DEVICE

BACKGROUND OF THE INVENTION

The invention relates to a device for detecting a hot point in a scene by means of infrared radiation. The device comprises a scanning system, a radiation-sensitive detection system for converting an infrared beam obtained into an electric signal, and an electronic processing circuit for processing the signal. The invention also relates to a missile guidance system equipped with such a device.

The infrared radiation sensed by the device has a wavelength greater than one micron. In order to obtain correct observations, allowance is to be made for the transparency of the atmosphere to the infrared wavelengths sensed. In practice two wavelength bands are employed, the first one being situated between 3.5 and 5 microns and the second one between 8 and 13 microns.

In order to detect a hot point, which has a temperature of for example 1500° K., in a scene with an average temperature of 300° K., the first band of wavelengths may be used. The hot point at 1500° K. has a maximum luminance Lλ. However, this gives rise to excessive contrast between the luminance of the hot point and the luminance of the various other points of the scene. The hot point produces a response of the detection system which is spread in time and has such a level that it makes responses produced by other parts of the scene. Thus, the hot point will therefore be observed as a spot which obscures the details of the scene.

The scene may also be observed in the second wavelength band, in which the contrast is smaller. However, in that case, if the hot point is viewed at an angle smaller than that of the elementary fields in which the scene is divided by the scanning system, the apparent luminance decreases with the square of the distance, so that a hot point which is situated too far can no longer be distinguished.

As proposed in German Patent Application No. 2,533,270, it is also possible to employ two bands of wavelengths at the same time, the first band only being employed for detecting the hot point and the second band for observing the scene. This presents problems with the scanning system. It is difficult to design such a system so that it performs satisfactorily in both wavelength bands at the same time.

SUMMARY OF THE INVENTION

It is an object of the present invention to provide a device operating in one wavelength band, which provides reliable detection and which is of simple construction.

According to the invention, an infrared detector includes a filter system for splitting the scanning beam into two subbeams. The filter system is arranged in the path of the scanning beam after the scanning system. The first and the second subbeams contain radiation of a wavelength in the first and the second subbands, respectively, of the wavelength band of the scanning beam. The detection system also comprises two radiation-sensitive detectors. The first and the second detector convert radiation of wavelengths situated in the first and the second subband, respectively, into an electric signal. An electronic processing circuit comprises a subtractor circuit whose inputs are connected to the outputs of the detectors and whose output signal is indicative of the occurrence of a hot point.

The invention is based on the recognition that the luminance of the hot point in the wavelength band in use decreases at increasing wavelengths, while the luminance of the scene in this band remains substantially constant. By dividing the wavelength band into two subbands by means of the filter system and by subtracting the electric signals caused by the radiation in each of the bands from each other, the hot point can be detected in a reliable manner.

DESCRIPTION OF THE PREFERRED EMBODIMENTS

Figure 1:
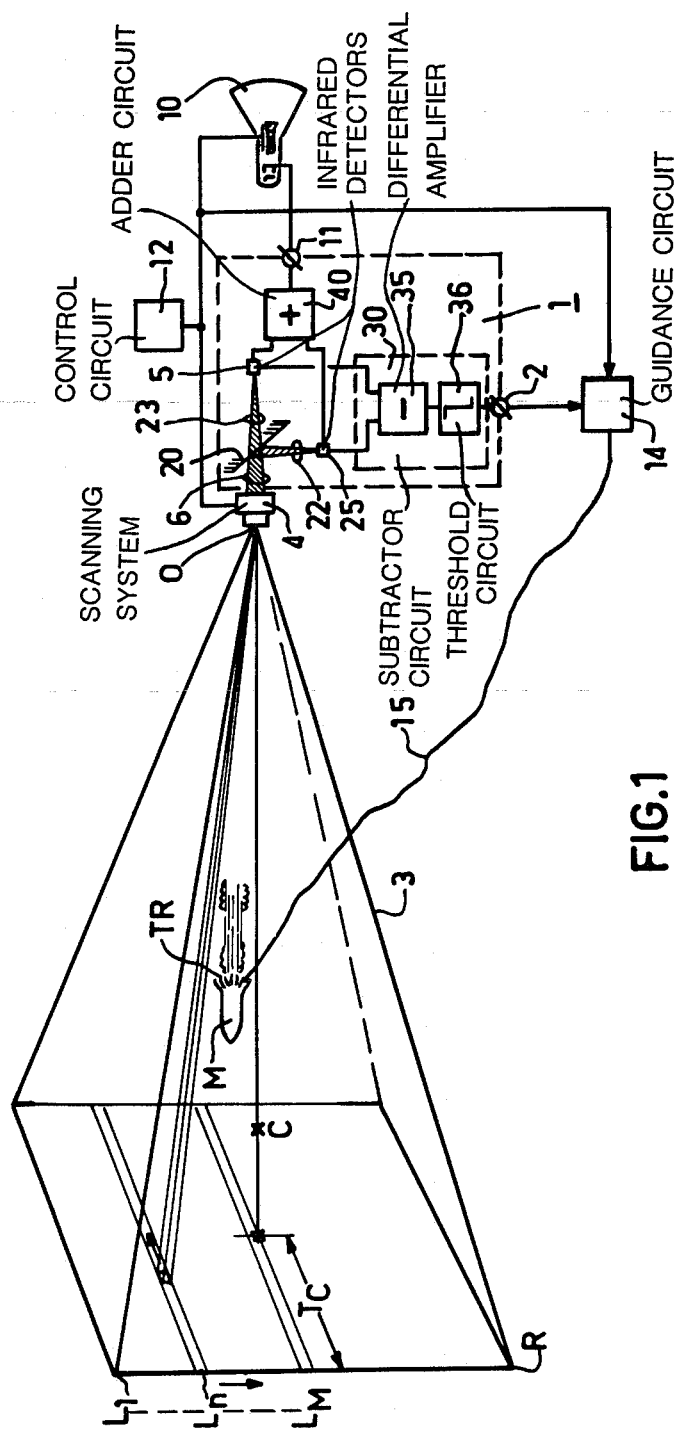
FIG. 1 is a schematic diagram of a missile guidance system equipped with a first embodiment of a device according to the invention for detecting a hot point in a scene.

FIG. 1 shows schematically, a system for guiding a missile M to a target C. This system comprises a device 1 for detecting a hot point, the presence of a hot point being indicated by a signal on the output terminal 2 of the device. In the present example the hot point is a tracer, TR, which is mounted on the exhaust pipe of the missile M and which has a temperature of substantially 1500° K.

The missile M and the target C are located in a scanning field which is bounded by a pyramid 3. The apex, 0, of pyramid 3 corresponds to the optical center of the scanning system 4. The base of pyramid 3 is a rectangle R.

Infrared radiation of a wavelength greater than one micron cannot be detected with a "Vidicon" device. The detector instead comprises a limited number of radiation-sensitive elements. In order to observe the entire scene it should be scanned point by point. For this purpose a scanning system 4 is employed, which sequentially directs a radiation beam 6, originating from different areas in the scene, at a radiation-sensitive detector 5. Scanning is effected along the lines L1, ..., Ln, ..., LM, ... in FIG. 1. Such a scanning system is, for example, described in the Applicant's French Patent Specification No. 2,245,970 (corresponding to U.S. Pat. No. 3,934,137). The detector 5 supplies a signal whose amplitude corresponds to the luminance of the object being observed. This signal for example enables the scene to be displayed on the screen of a cathode-ray tube 10 whose cathode is connected to the output 11 of the device 1. A control circuit 12 supplies the control signals for the scanning system 4 and for the cathode-ray tube 10, so that the electron beam is deflected exactly in synchronism with the scanning of the scene.

For guiding the missile M a graticule is superimposed on the displayed image. The center of the graticule is made to coincide with the target observed on the screen. The axis OC in the scene corresponds to the center of the graticule. This center is defined by a scanning line LM and a time interval TC which has elapsed since the start of the scanning line LM. Consequently, the hot point which corresponds to the missile will be detected on a different line and at another time. By means of a guidance circuit 14, which determines the coordinates of the hot point, the missile M can be guided to the target C by guidance signals. The guidance signals are sent to the missile by a connection 15 between the missile M and the guidance circuit 14.

According to the invention the device 1 for detecting a hot point is equipped with an optical filter 20, which splits the radiation beam 6 into subbeams 22 and 23, each of which contain a part of the wavelength band of the beam 6. The entire wavelength band is situated between 8 and 13 microns. The subbeam 22 contains radiation of wavelengths between 8 and 10.5 microns, and the beam 23 contains radiation of wavelengths between 10.5 and 13 microns. The detector 5 is arranged in the radiation path of the subbeam 23 and a radiation-sensitive detector 25 is arranged in the path of the subbeam 22. The output signals of these detectors are applied to the two inputs of a subtractor circuit 30.

The optical filter 20 may be a dichroic mirror, which reflects radiation of a wavelength between 8 and 10.5 microns and which transmits radiation of a wavelength greater than 10.5 microns. The subtractor circuit 30 may comprise a differential amplifier 35 followed by a threshold circuit 36. An adder circuit 40, whose inputs are connected to the outputs of the detectors 5 and 25, produces a scene-luminance signal on its output terminal 11.

Figure 2:
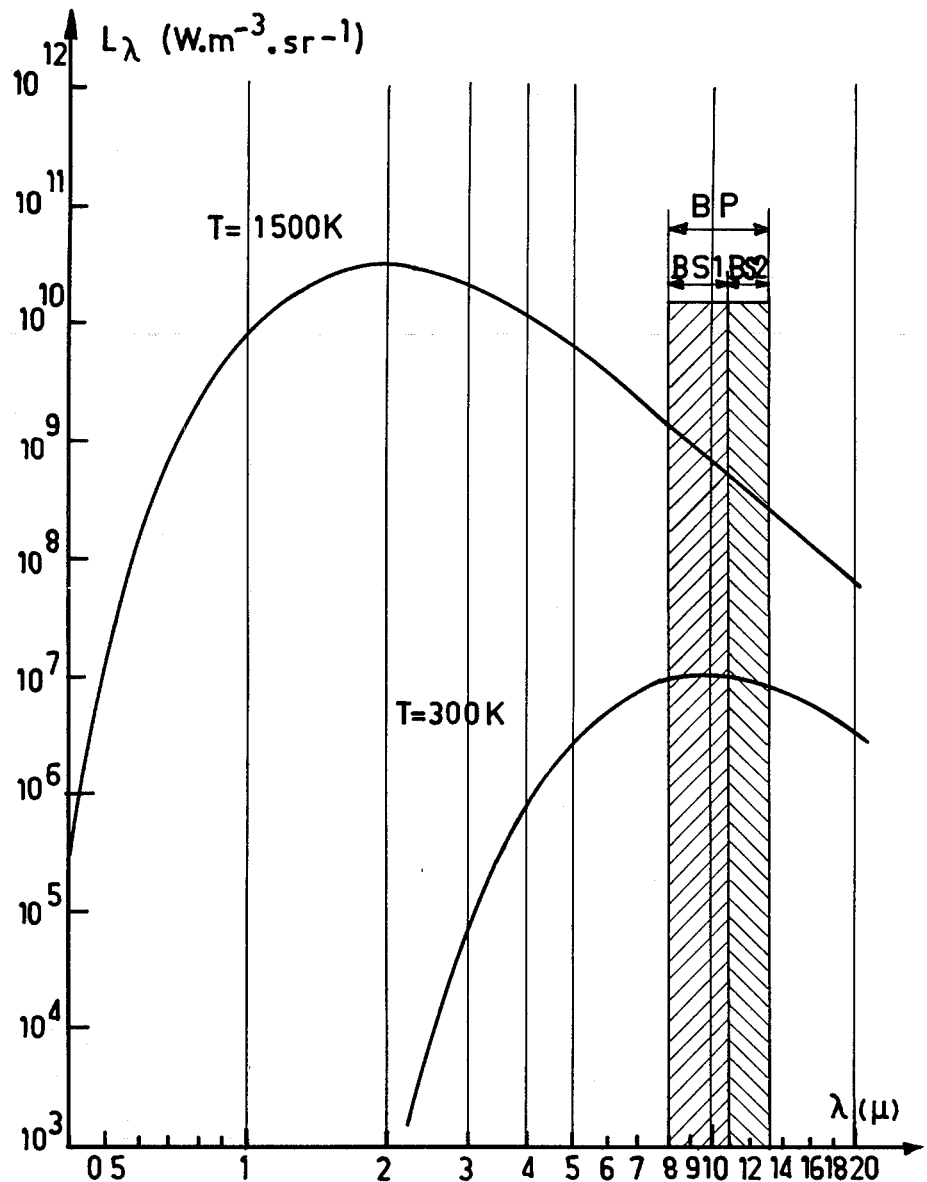
FIG. 2 is a graph of luminance as a function of wavelength for two different temperatures.

FIG. 2 represents the luminance $L\lambda$ as a function of the wavelength $\lambda$ for temperatures of 300° K. and 1500° K. Logarithmic scales have been selected for both coordinates. The luminance curves are given by Planck's radiation formula. The hatched area is the total wavelength band from 8 to 13$\mu$ which is employed. This band is divided into two subbands BS1, which ranges from 8 to 10.5 microns, and BS2, which extends from 10.5 to 13 microns. From FIG. 2, it can be seen that the luminance of a hot point at 1500° K. varies from $15 \times 10^9$ W.m$^{-3}$.sr$^{-1}$ to $6.25 \cdot 10^8$ W.m$^{31 3}$.sr$^{-1}$ in the first subband BS1 and from $6.25 \times 10.8$ W.m$^{-3}$.sr$^{-1}$ to $2.9 \times 10^8$ W.m$^{-3}$.sr$^{-1}$ in the second subband BS2. The luminance of a point at 300° K., which corresponds to the average temperature varies from $9.08 \times 10^6$ W.m$^{-3}$.sr$^{-1}$ to $9.79 \times 10^6$ W.m$^{-3}$.sr$^{-1}$ in the first subband and from $9.79 \times 10^6$ W.m$^3$.sr$^{-1}$ to $8.2 \cdot 10^6$ W.m$^{-3}$.sr$^{-1}$ in the second subband. Regardless of the distance of the hot point, this point (1500° K.) produces different energy contributions in the two bands. In contrast, the energy contribution of the point at 300° K. is substantially equal in both bands. The difference in energy contribution can be detected by means of the differential amplifier 35. The threshold circuit 36 produces a signal as soon as a specific difference is detected.

Figure 3:
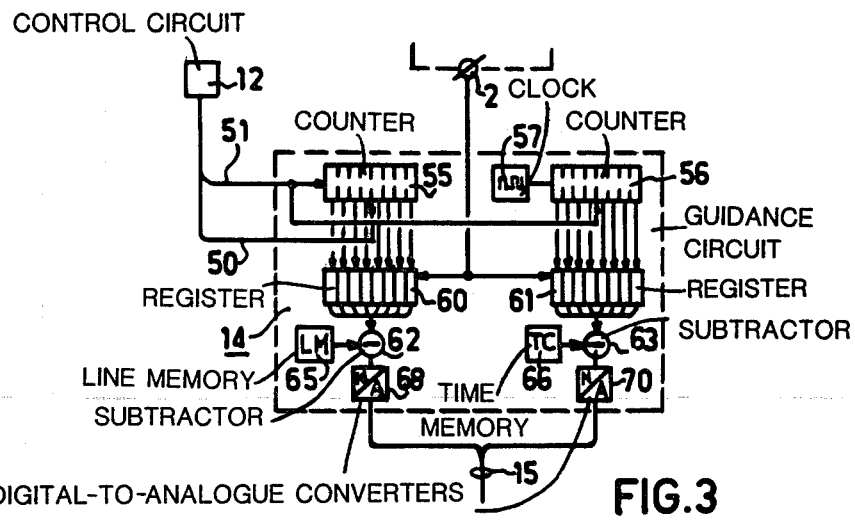
FIG. 3 is a schematic diagram of an embodiment of the electronic guidance circuit employed in the device of FIG. 1.

FIG. 3 schematically shows the guidance circuit 14 in detail. The signals from the control circuit 12, which indicate the start of the scene scanning, the start of the cathode-ray tube deflection, and the start of the line scans, are applied to the circuit 14 by connections 50 and 51, respectively. A first counter 55 of the circuit 14 counts the number of lines scanned. The count input of the counter 55 is connected to the circuit 12 by connection 51. The counter is reset to zero by the signal on the connection 50. A second counter 56 provides a measure of the time which has elapsed since the start of a scanning line. For this purpose this counter counts the signals from a clock 57 whose frequency is high relative to the line-scanning frequency. The counter 56 is reset to zero on the start of each scanning line by the signal on the connection 51.

The circuit 14 further comprises two registers 60 and 61, whose inputs are connected to the outputs of the respective counters 55 and 56. The control inputs of the registers 60 and 61 are connected to the input terminal 2 of the subtractor circuit 30. As soon as a signal appears on the output terminal 2 the contents of the counters 55 and 56 is transferred to the registers 60 and 61.

The difference between the coordinates of the missile M and those of the target C can be determined by means of subtractor elements 62 and 63. For this purpose the element 62 is connected to the register 60 and to the memory 65, which stores the number of the scanning line LM at which the center of the graticule is positioned. The element 63 is connected to the register 61 and to the memory 66 which contains the value of the time TC corresponding to the center of the graticule. The digital signals of the elements 62 and 61 are converted into analogue signals in two digital-to-analogue converters 68 and 70. The analogue signals are transmitted to the missile M via the connection 15, so that the path of the missile can be corrected in such a way that it reaches the target C.

Figure 4:
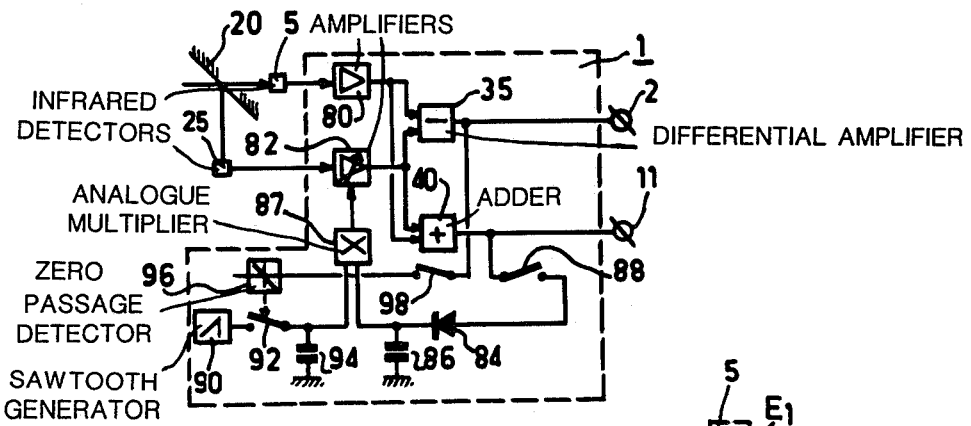
FIG. 4 is a schematic diagram of a second embodiment of the device according to the invention.

FIG. 4 shows a second embodiment of a device according to the invention. This embodiment comprises means for adjusting the levels of the signals supplied by the detectors 5 and 25. The adjusting means comprise two amplifiers 80 and 82 included between the detectors 5 and 25 and the inputs of the differential amplifier 35. The gain factor of amplifier 82 is adjustable. By adjusting the gain factor of the amplifier 82, the signal on the output of the differential amplifier 35 can be set to zero at a specific temperature, To, so that at a temperature T>To the output signal is negative and at a temperature T<To the output signal is positive. It is to be noted that the division is independent of the distance of the radiation source and solely depends on the spectral characteristics of the radiation. By suitably selecting To, it is readily possible to distinguish the tracer radiation from the scene radiation. The device shown in FIG. 4 operates with two time intervals: before firing and during firing.

Before firing the temperature of the hottest point of the scene is determined. For this purpose the device comprises a peak detector, which consists of a diode 84 and capacitor 86. The peak detector is connected to the output of the adder circuit 40 via a switch 88. The voltage across the capacitor 86 is applied to one of the inputs of an analogue multiplier circuit 87, whose output is connected to the control input of the variable-gain amplifier 82. To the other input of multiplier circuit 87, a voltage is applied which sets the output signal of the differential amplifier 35 to zero. This voltage is obtained from a sawtooth generator 90, whose output is connected to a storage capacitor 94 via a switch 92. The switch 92 opens as soon as the signal on the output of the differential amplifier 35 becomes zero, which is detected by means of a zero-passage detector 96. The input of the detector 96 is connected to the output of the amplifier 35 via a switch 98. The output signal of the detector 96 controls the switch 92. The gain factor of the amplifier 82 is thus controlled so that the signal on the output of the amplifier 35 is zero at the temperature, To, of hottest point of the scene.

During firing the switches 88 and 98 are opened, so that the tracer TR produces a negative signal which is easily discernible.

Figure 5:
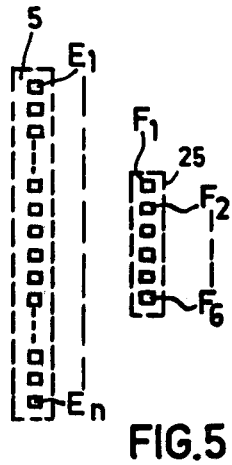
FIG. 5 is a schematic diagram of an example of the radiation-sensitive detectors employed in the device according to the invention.

So far it has been assumed that the detectors 5 and 25 comprise only one radiation-sensitive element. However, these detectors may alternatively comprise a plurality of radiation-sensitive elements. The detector 5, as is shown in FIG. 5, may for example be an array of radiation-sensitive elements E1, . . . , En, which each scan a specific line, so that the entire scene is analyzed by a single scan in one direction. The detector 25 may comprise a smaller number of radiation-sensitive elements F1, F2, . . . F6, which each scan one line in the center of the scene, i.e. in which the missile is moving. The output signal of the differential amplifier 35 can always be made zero by adjusting the gain of the amplifier 82.

In order to enable the radiation intensity in the two wavelength bands to be detected separately, it is not necessary to employ a dichroic beam splitter. The two detectors 5 and 25 may be arranged after each other in the path of the beam 6. The first detector should then be transparent to the wavelength to which the second detector is sensitive. For this purpose one can use cadmium/mercury telluride detectors, with a suitable relative proportion of cadmium-telluride and mercury-telluride. The spectral separation is then obtained by the difference in sensitivity range of the detector materials.

What is claimed is:

1. A device for detecting a hot point in a scene by means of infrared radiation in an infrared wavelength band, said device comprising:
    a scanning system for scanning the radiation in the scene and generating a scanning beam therefrom;
    a radiation-sensitive detection system for converting the scanning beam into an electrical signal; and
    an electronic processing circuit for processing the electronic signal; characterized in that:
    the device further comprises a filter arranged in the path of the scanning beam, said filter splitting the scanning beam into first and second subbeams, the first subbeam containing radiation of a wavelength in a first subband of the wavelength band, the second subbeam contained radiation of a wavelength in a second subband of the wavelength band;
    the detection system comprises first and second radiation-sensitive detectors, the first detector converting radiation of a wavelength in the first subband into an electrical signal, the second detector converting radiation of a wavelength in the second subband into an electrical signal; and
    the electronic processing circuit comprises a subtractor circuit whose inputs are the outputs of the detectors, and whose output signal indicates the occurrence of a hot point.

2. A device as claimed in claim 1, characterized in that the electronic processing circuit includes an adder circuit whose inputs are the outputs of the detectors, and whose output signal indicates the scene luminance.

3. A device as claimed in claim 2, characterized in that the electronic processing circuit further includes electronic elements for varying the levels of the detector output signals applied to the subtractor circuit.

4. A device as claimed in claim 3, characterized in that one of the level-varying electronic elements is controlled by the output signal of the subtractor circuit, the output signal of the subtractor circuit being set to zero when an object is observed at a chosen temperature.

5. A device as claimed in claim 4, characterized in that each detector comprises an array of radiation-sensitive elements.

6. A device as claimed in claim 5, characterized in that the wavelength band is approximately from 8 microns to 13 microns.

7. A system for guiding a missile to a target comprising:
    a device for detecting a hot point as claimed in claim 1;
    an infrared-emitting point source on the missile;
    an observation device for observing the missile and the target, said device having a graticule with coordinates whose center is, in operation, aimed at a target; and
    an electronic guidance circuit for calculating deviations between the coordinates of the infrared-emitting point source and the target, said guidance circuit supplying control signals to the missile.

8. A system as claimed in claim 7, characterized in that the output signal of the subtractor circuit is set to zero upon detection of the hottest point of the scene.

* * * * *